United States Patent Office 2,999,854
Patented Sept. 12, 1961

2,999,854
FLUORINATED ELASTOMERS AND CROSS LINKING THEREOF
Francis J. Honn, Westfield, and Willard M. Sims, Hackensack, N.J., assignors to Minnesota Mining and Manufacturing Company, St. Paul, Minn., a corporation of Delaware
No Drawing. Filed July 31, 1958, Ser. No. 752,196
10 Claims. (Cl. 260—79.5)

This application is a continuation-in-part of copending application S.N. 346,800 filed April 3, 1953, now U.S. Patent 2,965,619. This invention relates to new and useful fluorine-containing elastomeric compositions having improved properties, and to methods for the preparation thereof. In one aspect this invention relates to new and valuable high molecular weight fluorine-containing elastomers having improved properties. In another aspect this invention relates to a process for the production of new and valuable high molecular weight fluorine-containing elastomers.

This invention also relates to the cross-linking of fluorinated, linear, saturated polymers and, more particularly, to the vulcanization of fluorinated, linear, saturated elastomers.

As an accumulative group fluorine-containing polymeric compositions offer wide utility in various industrial applications due to the desirable properties which they possess such as good physical and chemical stability. One of the most useful polymers in this field is the high molecular weight thermoplastic homopolymer of trifluorochloroethylene which possesses excellent chemical inertness, exhibits flexibility and resilience and is not affected by water, or by humidity and, in general, is an efficient insulating material. At the same time, however, certain of the other properties of the highly fluorinated resinous thermoplastic materials (for example, polytetrafluoroethylene and polytrifluorochloroethylene) such as their insolubility in organic solvents even at moderate temperatures, requires that such polymers be used in the form of special dispersions when applying them, for example, as protective coatings, and that even then a fusion technique is employed in order to form a continuous coating or film of the polymer. Further the techniques presently employed for molding polytrifluorochloroethylene thermoplastic, for example, require the use of high temperatures ranging between about 415° F. and about 625° F. which temperatures are often necessary in order to cause the polymer to flow readily. Such temperatures, however, may also cause undesirable degradation of the polymer.

In addition to the desirability of having a fluorine-containing thermoplastic having improved properties, there also has been a demand for a synthetic elastomer which possesses a combination of chemical inertness to strong and corrosive chemicals such as fuming nitric acid, inertness to aromatic and aliphatic oils and fuels, and especially inertness to swell by hydraulic ester type fuels, high tensile strength, retention of its elastomeric properties over a wide range of temperatures, that is, from temperatures of about −30° F. to about 600° F., solubility in relatively volatile organic solvents and vehicles, and which is easily vulcanized and fabricated into a wide variety of articles such as protective films, wire coatings, etc.

Linear or chain polymers are thermoplastic in nature. They exhibit continuous flow under the influence of heat and pressure. Such polymers can be resoftened as often as desired and are usually soluble in selected solvents. Some chain polymers are elastomeric in nature, that is to say, they stretch readily under external tension and retract rapidly and completely on release of tension.

Vulcanized or cross-linked elastomers may have equal, greater or lesser extensibility than the linear elastomers, depending on the number and nature of the cross-linkages. In any case, they have lessened plasticity and solubility and increased toughness and heat resistance.

Fluorinated elastomers have been found to be extremely useful in cases where chemical inertness, thermal stability and/or electrical insulation properties are desirable. Fluorinated elastomers are useful in any situation where elastomers are used and where chemical inertness and/or electrical insulation properties are desired. Many of these elastomers possess the additional advantage of retaining their elastomeric properties over a greater temperature range than previously known elastomers.

It is therefore an object of the present invention to provide new and valuable fluorine-containing polymeric materials having improved properties, and to provide a method for the manufacture thereof.

Another object of this invention is to provide new fluorine-containing polymers which can be molded into a variety of useful end products at temperatures which are below that at which degradation or discoloration of the polymer occurs.

Another object is to provide synthetic elastomers which are easily vulcanized and which retain their flexibility when exposed to low temperatures, and which are resistant to degradation and hardening at tempeartures up to 600° F.

Another object is to provide synthetic, completely amorphous elastomeric materials which are resistant to strong and corrosive chemicals such as fuming nitric acid and to aromatic, aliphatic and ester type fuels and which have good physical and mechanical properties.

A further object is to provide fluorine-containing elastomers which are readily applied as protective coatings to surfaces which are to be exposed to strong chemicals or corrosive fuels.

A further object is to provide fluorine-containing elastomers having a combination of the above properties and which are readily fabricated into a wide variety of useful end products.

A still further object is to provide a process for the manufacture of fluorine-containing polymers having the above-mentioned desirable characteristics.

It is also an object of this invention to cross-link fluorinated, linear, saturated elastomers.

It is a further object of this invention to prepare soft vulcanizates of fluorinated, linear, saturated elastomers of increased toughness and heat stability but unreduced or even superior extensibility.

It is a further object of this invention to produce hard thermosetting vulcanizates of fluorinated, linear, saturated elastomers.

It is a further object of this invention to reduce the solubility of fluorinated, linear, saturated elastomers produced by the copolymerization of at least two monoolefinic compounds.

It is a further object of this invention to produce tough, chemically inert coatings from solutions of fluorinated, saturated, linear elastomers.

Other objects and advantages will be apparent from the following description and disclosure.

These and other objects are accomplished by the following invention. Linear elastomers comprising disordered, saturated, fluorinated carbon chains, and including a substantial number of carbon atoms which are linked only to hydrogen and to other carbon atoms are produced by copolymerization of appropriate monomers and subsequent reaction with a cross-linking agent at elevated temperatures to produce the vulcanized elastomer. Ordinarily, the above linear elastomer is at least 10 percent comprised of —$CH_2$— groups.

Disorder in the linear, saturated, fluorinated carbon chains is ordinarily achieved by the copolymerization of at least two mono-olefinic compounds of the type hereinafter described. In order to obtain chemical stability in an elastomer, at least one of the mono-olefinic compounds must be fluorinated. In order that the copolymer be elastomeric in nature, at least one of the mono-olefinic compounds must contain at least one carbon atom linked only to hydrogen and carbon atoms. At least 10 percent of the carbon atoms in the chain must be of this type in order to obtain an elastomeric product. Ordinarily, a mono-olefinic compound containing a $CH_2$— group is used and this results in the linear chains containing —$CH_2$— groups. When the mono-olefinic compound contains an unsaturated chain of three or more carbon atoms, alkyl, preferably methyl, groups are present and these remain as side groups on the linear chain, preferably comprising at least 10 percent of the carbon atoms in the chain. At least half of these methyl side groups are perhalogenated and preferably all are perfluorinated, for maximum stability of the final elastomer. Points of unbalance in the carbon chain, which are necessary for an elastomer, are provided by such methyl side groups. These side groups, which cause a bending of the linear carbon chain and thus provide additional degrees of freedom in space, produce an unsymmetrical or unbalanced chain carbon atom to which they are attached, provided a second similar group is not also attached to the same carbon atom. Preferably this unbalanced carbon atom also contains a fluorine substituent. However, unbalance is also produced by the presence of other groups in the linear carbon chain, such as —CFCl— groups, and may be produced by the presence of both methyl side groups and —CFCl— groups. Such unbalanced carbon atoms comprise, as previously stated, at least 10 percent of the chain carbon atoms in the elastomer. If two mono-olefinic monomers are copolymerized, one of the monomers preferably contains 3 carbon atoms to produce this methyl side group. The remainder of the carbon atoms in the elastomer chain structure, i.e. other than —$CH_2$— and those containing a methyl side group, are halogenated, preferably fluorinated, carbon atoms, and are equal in number to one half of the total chain carbon atoms.

This linear, saturated, fluorinated carbon chain of the elastomer may also contain chlorine substituents, provided a single chain carbon atom has no more than one chlorine attached thereto to produce instability or influence the chemical nature of the elastomer. The presence of more than one methyl or chlorine substituent on a single carbon atom produces symmetry, and thus a point of rigidity in the chain, decreasing the flexibility of the chain and the elastomeric properties accordingly.

The preferred elastomeric polymers of this invention comprise a disordered, linear, saturated carbon chain with perfluoromethyl side groups, the chain containing only carbon, hydrogen and halogen selected from fluorine and chlorine. Each halogenated carbon atom in the chain is linked only to halogen and carbon atoms but contains no more than a single halogen, other than fluorine, substituent, such as chlorine. At least 10 percent of the chain carbon atoms are —$CH_2$— groups, and at least 10 percent of the chain carbon atoms are unbalanced by perfluoromethyl side groups.

Among the fluorinated mono-olefinic compounds which may be used as comonomers to produce the above fluorine-containing elastomers are: $CF_2=CFCl$, $CF_2=CH_2$, $CF_3$—$CF=CF_2$, $CH_2CFCl$, cis $CF_3$—$CH=CH$—$CF_3$, $CF_2=CF_2$, trans $CF_3$—$CH=CH$—$CF_3$, $CF_2=CCl$—$CF_3$, $CF_2=CF$—$CF_2Cl$, $CF_3$—$CH=CH_2$, $CF_3$—$CF=CH_2$. These fluorinated mono-olefinic compounds may be copolymerized with each other, provided at least one of the comonomers contains at least one carbon atom bonded only to hydrogen and carbon atoms.

Among the copolymer systems which have $CF_3$ side chain unbalance and which are sufficiently fluorinated to make them physically and chemically stable are the following:

| | |
|---|---|
| Vinylidene fluoride | 2-chloroperfluoropropylene |
| Perfluoropropylene | 1,1-fluorochloroethylene |
| 1,1-fluorochloroethylene | 2-chloroperfluoropropylene |
| Perfluoropropylene | Vinylidene fluoride |
| 1,1,1,2-tetrafluoropropylene | Tetrafluoroethylene |

The elastomer of trifluorochloroethylene and vinylidene fluoride is illustrative of the stable elastomer structure having the —CFCl— type unbalance.

The copolymerization reaction may be carried out in either an aqueous system or in a mass polymeriaztion system. In the former system the reaction is preferably carried out at a temperature between about 0° C. and about 65° C. In a mass polymerization system the reaction is preferably carried out at a temperature between about —20° C. and about 0° C. With a water suspension type system a redox catalyst system is preferred. It has and contains an oxidant, a reductant and a variable valence metal salt. The oxidant in the water suspension type recipe is preferably an inorganic persulfate, such as potassium persulfate, sodium persulfate or ammonium persulfate, the latter being most desirable. The reductant is preferably a bisulfite, such as sodium bisulfite or potassium bisulfite, and preferably the former. The variable valence metal salt which is employed for the purpose of regenerating the oxidant is preferably in the form of an iron salt, such as ferrous sulfate or ferrous nitrate with ferrous sulfate being the most desirable variable valence metal salt. Various dispersing agents, such as the fluorocarbon acids and salts, as hereinafter described, are preferably used.

Best results are obtained by conducting the polymerization process of the present invention in an aqueous emulsion polymerization system using an emulsifier, such as a perfluorochloro-carboxylic acid of 6 to 12 carbon atoms. The presently described process is generally carried out at or below autogenous pressure, e.g. 125 p.s.i.g., to prevent monomer condensation and formation of undesirable heterogeneous polymers, and at a temperature below about 75° C. and with a residence time of 2 to 100 hours. The polymers thereby obtained are valuable macromolecules which are adaptable to a number of commercial uses based on the fact that they are tough and rubber-like materials possessing varying degrees of flexibility, elasticity, and extensibility and which are readily vulcanized and processed.

In the mass polymerization system, organic peroxide promoters, and particularly halogen-substituted acyl peroxide are used. Trichloroacetyl peroxide is a preferred promoter of this type. Other halogen-substituted organic peroxides suitable for carrying out the polymerization are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

The copolymers of perfluoropropylene and vinylidene fluoride of one preferred embodiment of the present invention are particularly outstanding and unique with regard to their remarkable high temperature properties and excellent resistance to powerful and corrosive chemicals such as fuming nitric acid and aromatic, aliphatic and ester type oils, fuels, and lubricants in general. These elastomeric copolymers containing at least 20 mol percent of the combined perfluoropropylene are completely amorphous and are particularly outstanding for their low torsional modulus and retention of their rubbery properties over a wide range of temperatures, i.e. between about —30° C. and about 600° C. without embrittlement, degradation or hardening.

The copolymers of this embodiment of the present invention contain perfluoropropylene and vinylidene fluoride in varying comonomer ratios. The particular composition of the polymer products obtained in any particular copolymerization reaction of these two monomers depends to some extent upon the composition of the monomer mixture initially charged to the reaction zone and the reaction conditions employed to effect copolymerization. Any composition of the monomer mixture can be used but 5 to 95 mol percent of each monomer is preferred. In carrying out the polymerization reaction between perfluoropropylene and vinylidene fluoride to produce elastomers of this preferred embodiment, the ultimate copolymer contains from about 20 mol percent perfluoropropylene, corresponding to 10 percent of the chain carbon atoms unbalanced by a perfluoromethyl group, to about 80 mol percent perfluoropropylene, corresponding to 10 percent of the chain carbon atoms as —$CH_2$—.

As indicated above, the copolymerization reaction is carried out in the presence of a polymerization promoter which may be a free radical forming or an ionic type promoter. The free radical forming promoters or initiators comprise the organic and inorganic body peroxy and azo compounds. The ionic initiators comprise inorganic halides of the Friedel-Crafts catalyst type, and mineral acids. The initiator is generally employed in an amount between about 0.001 and about 5 parts by weight per 100 parts of total monomers employed, and preferably are employed in an amount of between about 0.01 and about 1.0 parts by weight.

The emulsifier which is employed in the aqueous emulsion systems comprise the inorganic derivatives derived from aliphatic carboxylic acids including both the unsubstituted hydrocarbon and halogen-substituted aliphatic carboxylic acids. The non-halogenated hydrocarbon type of emulsifiers or soaps comprise the metal salt derivatives such as the potassium and sodium salts derived from hydrocarbon aliphatic acids having an optimum chain length between about 14 and about 20 carbon atoms per molecule and are typically exemplified by potassium stearate, sodium oleate and potassium palmitate, and any mixture thereof.

The preferred emulsifiers are the halogen-substituted carboxylic acids which are at least half fluorinated and which have between about 4 and about 20 carbon atoms per molecule. The particularly preferred halogen-substituted emulsifiers are the perfluorochloroalkanoic acids having at least 2 fluorine atoms for every chlorine atom and the perfluoroalkanoic acids, said halogen-substituted emulsifiers having between about 6 and about 14 carbon atoms per molecule.

Typical examples of the preferred emulsifiers employed in accordance with the present invention are the potassium and sodium salts of perfluorohexanoic acid, perfluorooctanoic acid, 3,5,6-trichlorooctafluorohexanoic acid and 3,5,7,8-tetrachloroundecafluorooctanoic acid. Other halogenated emulsifiers which may be used are the derivatives of the organic polyfluorocarboxylic acids disclosed in U.S. Patent No. 2,559,752 as being efficacious dispersing agents in polymerization reactions, as well as the perfluorochloro acids of U.S. Patents 2,806,865 and 2,806,866 and the perchlorofluoro acid salts of U.S. Patent 2,806,867.

The emulsifier is generally employed in a quantity between about 0.2 and about 10.0 parts by weight per 100 parts of total monomers charged, and preferably between about 0.5 and 5.0 parts by weight are used.

Although the pH of the aqueous polymerization system may be between about 2 and about 10, it has been found that best results are obtained in an aqueous system at a pH between about 4 and about 8. Appropriate pH conditions are maintained by the addition of a buffer as an ingredient of the polymerization catalyst system. Such buffers comprise disodium hydrogen phosphate and sodium metaborate. When the emulsifier is charged to the polymerization zone as a free acid such as perfluorooctanoic acid, it is best to employ a buffer such as disodium hydrogen phosphate and to maintain the pH of the system within the preferred range, that is, between about 4 and about 8.

The polymerization reaction can be carried out in a batchwise or continuous manner as desired. In conducting the polymerization in a continuous manner a mixture of the monomers is passed continuously through a zone which is maintained at reaction conditions and which can be provided with stirrers or other means of agitation. Alternatively, the catalyst can be injected into the system which is passing through the reaction zone.

The polymerization reactions which are carried out in the presence of the polymerization promoters of the present invention normally tend to form very high molecular weight copolymer products, that is, polymers having a molecular weight of at least 50,000. A reduction of the strength of the recipe of polymerization promoter merely slows the rate of reaction without appreciably affecting the molecular weight of the finished copolymer. Variations in polymerization conditions do not materially affect the molecular weight of the product but primarily influence the yield. However, temperature and rate of agitation do alter somewhat the molecular weight of the copolymer.

By the method of this invention these rubbery copolymers may be transformed into soft vulcanizates of increased strength and toughness, of decreased solubility and of the same or increased extensibility. The cross-linking agents used to produce the cross-linked elastomers of this invention may be of various types and may depend on any of several reactions to produce their cross-linking. In general, the cross-linking agents react to remove a hydrogen or halogen atom from a carbon atom on the polymer chain and thereby produce a free radical spot on the chain which is capable of linking to a similar free radical spot on another chain, either directly or indirectly. Among the cross-linking agents which may be used in this invention are the peroxy-type compounds and inorganic polysulfides. If desired, mixtures of the same or different types of cross-linking agents may be used.

The peroxy-type compounds include both organic and inorganic compounds which contain oxygen atoms directly linked to oxygen atoms. The peroxy-type compounds used in this invention must be stable below about 50° C. or else they will cause cross-linking while they are being blended into the copolymer. Among the organic compounds are the acyl and acoyl peroxides and hydroperoxides, such as ditertiary butyl peroxide, dilauryl peroxide, dibenzoyl peroxide, and ditertiary butyl hydroperoxide. The organic peroxy-type compounds also include peresters having either organic or inorganic peroxy oxygen. The former would include such compounds as alkyl and aryl perbenzoates. The latter would include alkyl and aryl persulfates.

Among the inorganic peroxy compounds are hydrogen peroxide and metal peroxides, such as lead peroxide, barium peroxide and zinc peroxide.

While it is not desired to be bound by any particular theory of operation, it is believed that the peroxy-type compounds remove a hydrogen atom from a carbon atom on the linear chain and thereby produce an activated free radical spot on the chain. This spot links directly to a similar free radical spot on another chain and thus produces a cross-linked polymer.

Among the inorganic polysulfides which may be used as linking agents are the alkali metal polysulfides and ammonium polysulfide. The generally accepted formula for a sodium polysulfide, for example, is $Na(S)_nNa$. It is believed that this compound breaks up into two sodium ions and a bivalent chain of sulfur atoms. Each of the sodium ions reacts with and removes a halogen atom from a linear polymer chain and leaves a free radical spot on the chain. Each end of the chain of sulfur atoms links to a free spot on a different polymer chain and thereby links the chains together.

Basic metal oxides, such as magnesium oxide, zinc oxide and lead oxide (PbO), may also be used in conjunction with other cross linking agents, such as organic peroxides.

The cross-linking reaction, with any of the above cross-linking agents, may require or may produce materials which have an adverse effect on the properties of the cross-linked polymer. For example, the metallic halides produced by the reaction of inorganic basic metal oxides with the halogen atoms of the polymer might reduce the chemical inertness and electrical resistance of the polymer. However, since relatively few cross-linkages are required to produce a substantial alteration in the characteristics of the polymer, relatively small amounts of cross-linking agents are required. In producing a cross-linked polymer for special processes where a high degree of chemical inertness or electrical resistance is required, conditions may be controlled so that a minimum of undesired material remains in the polymer.

There are several methods of reacting the linear elastomers with cross-linking agents, depending on the character of the elastomer, the character of the cross-linking agent and the character of the desired product. Cross-linking agents may be easily incorporated into the elastomers by mechanical mixing, either with or without plasticizers. Such mechanical mixing involves shearing forces and is carried out in equipment such as 2-roll mills, Banbury (internal) mixers and screw-type plasticators, which resemble extruders. Somewhat elevated temperatures of the order of from about 50° to about 100° C. ordinarily prevail in the mixing operation due to the mixing action itself and to the exothermic nature of the linking reaction. Articles to be molded are then heated in the mold with additional heat, as by hot air, steam or hot press platens, thereby shaping and cross-linking simultaneously. The temperature in the mold may range from about 120° C. to 200° C.

Since mechanical mixing generates heat and since it is difficult to blend other materials into a cross-linked polymer, it is usually desirable to blend other materials into the polymer first and then add the linking agent last, just before fabrication. Among the other materials which might be added to the aforesaid polymers prior to cross-linking are fillers, pigments and plasticizers.

With certain polymers and for certain uses, particularly for coatings, polymers may be cross-linked from solutions. The polymer and linking agent are dissolved in a suitable solvent, the solution is applied to a surface, such as a fabric or a metal, and then the coating is dried and heated to cross-link the polymer. In some cases, the coating is adherent and in other cases, it may be stripped off to form a self-supporting film of cross-linked polymer.

Still another method of cross-linking a linear polymer involves the use of a milk emulsion or "latex." As stated above, the copolymerization product may be prepared in a water emulsion type system. In such a system the product is removed from the reactors as a latex. For most purposes, the dry rubbery copolymer is recovered by coagulation of the latex with salts and acids followed by washing and drying. But for other purposes, such as dip coating and spraying, the latex can be used directly. In these cases, the other ingredients (fillers, cross-linking agents, etc.) are dispersed in water containing a surface-active agent, and these dispersions are blended with the latex. The latex is then applied as a coating to a surface (similar to the solutions disclosed above) and the polymer is cross linked as the latex is dried and heated.

Still another method of reacting the linear elastomers with a cross-linking agent involves the reaction of the cross-linking agent with the elastomer in its fabricated state. Since this method involves the penetration of the elastomer by the cross-linking agent, it is adaptable primarily to very thin sections of elastomer, such as in coatings or in self-supporting films. The coating or film is maintained in contact with the cross-linking agent, at elevated temperatures and preferably under pressure, for a period of time ranging from about one hour to several days. This results in the vulcanization of the elastomer and in the changing of the characteristics of the linked polymer to those of a space polymer.

The cross-linked halogenated elastomers prepared by this invention may be used for most of the purposes for which halogenated polymers generally have been used. These elastomers have essentially the same characteristics of chemical inertness and insulating ability as halogenated polymers, generally, and in addition, have the toughness and resilience associated with a vulcanized elastomer. The cross-linked elastomers of this invention cannot be readily molded and cannot be put into solution after cross linking. In a practical sense, however, in most cases, the cross-linking step can be performed as the final step in fabrication and thereby make subsequent solution or molding unnecessary.

Molded articles can be made, as described above, by heating and compressing a mixture of the linear elastomer and the cross-linking agent in a mold. The articles thus produced have all of the advantages of chemical inertness of the linear halogenated elastomer, at the same time, having greater toughness and better heat stability.

Films of cross-linked halogenated elastomers, formed in situ, may be used for the protection of metallic surfaces against corrosive conditions. Such films have substantially the same chemical inertness as the films of linear elastomer, but greater toughness and better heat resistance.

The cross-linked elastomers of this invention can also be used as wire coatings since the advantageous electrical properties of the halogenated elastomers are only slightly reduced in cross-linking by the production of by-product materials.

The cross-linked elastomers of this invention may also be used as impregnates and/or as coatings for yarns and fabrics, including the yarns and fabrics of asbestos, glass, synthetic resins and natural fibers.

The following examples are offered as a better understanding of the present invention and are not to be construed as unnecessarily limiting thereto. The Gehman stiffness values given in the following examples were determined according to ASTM designation D-1053-49T.

*Example 1*

A 300 ml. aminco bomb was flushed with nitrogen and was then charged with the following aqueous emulsion catalyst system:

(1) 15 ml. of water containing 0.3 gram of dissolved sodium metabisulfite,
(2) 90 ml. of water containing 0.56 gram of potassium perfluorooctanoate, the pH of this solution having been adjusted to 12 by the addition thereto of a 5 percent aqueous potassium hydroxide solution, and
(3) 45 ml. of water containing 0.75 gram of dissolved potassium persulfate.

Each ingredient was charged separately and the contents of the bomb were frozen after each addition by placing the bomb in a liquid nitrogen bath. The bomb was then connected to a gas transfer system and evacuated at liquid nitrogen temperature. Thereafter the bomb was charged with 37.5 grams of perfluoropropylene and 37.5 grams of vinylidene fluoride to make up a total monomer charge containing 30 mol percent of perfluoropropylene and 70 mol percent of vinylidene fluoride. The bomb was then closed and placed in a mechanical shaker. The polymerization reaction was conducted under autogenous pressure at a constant temperature of 50° C. for a period of 19.5 hours, after which time the bomb was opened and vented to atmospheric pressure to remove unreacted monomers. The contents of the bomb were then frozen in a solid carbon dioxide-acetone bath to coagulate the polymer latex. The coagulated product was collected, thoroughly washed with hot water to remove residual salts and dried in vacuo at a temperature of 35° C. The product of this reaction was a white and tough elastomeric copolymer and was obtained in a 78.7 percent conversion based on the weight of total monomers charged.

Upon analysis this product was found to contain 67.3 percent fluorine and 31.44 percent carbon. The mol percents of combined perfluoropropylene and combined vinylidene fluoride, based on the carbon analysis, were found to be 26.7 and 74.3, respectively, or a weight percent of combined perfluoropropylene and vinylidene fluoride of 45.8 and 54.2, respectively, based upon the carbon analysis.

This perfluoropropylene vinylidene fluoride copolymer containing 26.7 mol percent of combined perfluoropropylene milled easily in a rubber mill at 25° to yield a tough, rubbery sheet, and when pressed between chrome-plated ferrotype plates in an electrically heated Carver press at 325° F. for a period of about 5 minutes at 10,000 pounds per square inch gage yielded a clear, transparent rubbery sheet.

The raw copolymer was found to be insoluble at room temperature in concentrated nitric acid after 4 days, in carbon bisulfide and toluene after 6 hours and in diethyl ether after 21 hours, but completely dissolved in ethyl acetate. The rubbery copolymer produced by the procedure of this example was found to have a volume swell of only 9 percent when added to ASTM type II fuel (60 percent by volume of isooctane, 20 percent toluene, 5 percent benzene and 15 percent xylene), and exhibited only a 16 percent volume swell when added to red fuming nitric acid for 22 hours at 25° C.

*Example 2*

After flushing a 300 ml. aminco polymerization bomb with nitrogen, the following aqueous emulsion polymerization catalyst system was charged to the bomb after the addition of each ingredient:

(1) 15 ml. of water containing 3.0 grams of dissolved disodium hydrogen phosphate heptahydrate,
(2) 90 ml. of water containing 0.75 gram of 3,5,7,8-tetrafluoroundecafluorooctanoic acid, and
(3) 45 ml. of water containing 0.75 gram of dissolved potassium persulfate.

The pH of the polymerization catalyst system was found to be about 7. The bomb was then connected to a gas transfer system and evacuated at liquid nitrogen temperature. The polymerization bomb was then charged with 30 grams of perfluoropropylene and 30 grams of vinylidene fluoride corresponding to a total monomer charge containing 30 mol percent of perfluoropropylene and 70 mol percent of vinylidene fluoride. The polymerization bomb was then closed and placed in a mechanical shaker. The polymerization reaction was carried out with constant shaking of the bomb in a constant temperature bath maintained at a temperature of 50° C. for a period of 22 hours under autogenous pressure. At the end of 22 hours the polymerization bomb was vented to atmospheric pressure and the unreacted monomers were removed. The polymer latex was coagulated by freezing it at solid carbon dioxide temperature. The coagulated product was collected, washed thoroughly with hot water to remove residual salts and dried in vacuo at 35° C. A tough white elastomeric product was obtained in about a 76 percent conversion. Upon analysis the product was shown to contain 31.27 percent carbon corresponding to 32 mol percent of combined hexafluoropropene and 68 mol percent of combined vinylidene fluoride or 50.2 weight percent of combined hexafluoropropene and 49.8 weight percent of combined vinylidene fluoride.

*Example 3*

After flushing a 40 ml. aminco bomb with nitrogen, the bomb was charged with the following aqueous polymerization catalyst system, freezing the contents of the bomb after the addition of each ingredient:

(1) 12 ml. of water containing 0.1 gram of potassium perfluorooctanoate, the pH having been adjusted to 12 by the addition of a .5 percent aqueous solution of potassium hydroxide,
(2) 2 ml. of water containing 0.4 gram of dissolved disodium hydrogen phosphate heptahydrate, and
(3) 5 ml. of water containing 0.1 gram of dissolved potassium persulfate.

The pH of the polymerization system was found to be about 7. The bomb was then connected to a gas transfer system and evacuated at liquid nitrogen temperature. Thereafter the bomb was charged with 9.55 grams of perfluoropropylene and 0.445 gram of vinylidene fluoride corresponding to a total monomer charge containing 90 mol percent of perfluoropropylene and 10 mol percent of vinylidene fluoride. The polymerization reaction was conducted with mechanical shaking of the bomb at a constant temperature of 50° C. for a period of 22 hours under autogenous pressure. A white highly amorphous elastomer was obtained in about a substantial conversion. Carbon analysis of this product showed it to contain about 59.0 and about 41.0 mol percent of combined perfluoropropylene and vinylidene fluoride, respectively.

*Example 4*

The copolymer produced by the procedure of Example 2 was vulcanized by admixing 43.9 grams of the raw copolymer with 1.3 grams of benzoyl peroxide, 4.4 grams of dibasic lead phosphite and 4.4 grams of zinc oxide. The resultant admixture was then placed in a press for one-half hour at a temperature of 230° F. and at a pressure of 20,000 pounds per square inch. The stock was then placed in an oven and heated at a temperature of 300° F. for a period of 16 hours. The vulcanized sample was a tough and snappy rubber having a tensile strength of 1500 pounds per square inch; a 100 modulus (stress at 100% elongation) of 450 p.s.i.; a 300 modulus (stress at 300% elongation) of 900 p.s.i. and an ultimate elongation of 425 percent. The vulcanized copolymer also exhibits outstanding resistance to swell by ester type hydraulic fluids. For example, the copolymer exhibited less than a 5 percent volume swell when exposed to Esso Turbo Oil 15 for 3 hours at 350° F. and 410° F.

*Example 5*

One hundred parts by weight of equimolar elastomeric copolymer of chlorotrifluoroethylene and vinylidene fluoride, 15 parts by weight of a mixture of low molecular weight oily polymers of chlorotrifluoroethylene, as a plasticizer, and 15 parts by weight of benzoyl peroxide were thoroughly blended together on the cold rolls of a 2-roll mill. The blend was then press-cured for about one hour at 149° C. The cure was found to have converted the normally acetone-soluble copolymer into an insoluble product.

*Example 6*

One hundred parts by weight of an elastomeric copolymer of chlorotrifluoroethylene and vinylidene fluoride, containing 62 mol percent of the former and 38 mol percent of the latter, 30 parts by weight of carbon black, 2 parts by weight of stearic acid and 3 parts by weight of sodium polysulfide were thoroughly blended together on the cold rolls of a 2-roll mill. The blend was then press-cured for about one hour at 171° C. The cure was found to have converted the normally acetone-soluble copolymer into an insoluble product.

Since certain changes may be made in carrying out the process of the present invention in producing the disclosed elastomeric polymers and in vulcanizing such elastomeric polymers without departing from the scope of the invention, it is intended that all matter contained in the above description be interpreted as illustrative and not as limiting.

We claim:

1. A vulcanization process which comprises reacting at a temperature above about 50° C. minor amounts of a cross-linking agent selected from the group consisting of organic and inorganic peroxy compounds which are stable below about 50° C. and inorganic polysulfides with an elastomeric copolymer of perfluoropropylene and a fluorinated ethylene selected from the group consisting of vinylidene fluoride and 1,1-fluorochloroethylene.

2. The vulcanization process of claim 1 wherein the elastomeric copolymer is a copolymer of perfluoropropylene and vinylidene fluoride.

3. The vulcanization process of claim 1 in which the elastomeric copolymer is a copolymer of perfluoropropylene and vinylidene fluoride and the crosslinking agent is an organic peroxide which is stable below about 50° C.

4. The vulcanization process of claim 1 wherein the elastomeric copolymer is a copolymer of perfluoropropylene and 1,1-fluorochloroethylene.

5. A vulcanizate of an elastomeric copolymer of perfluoropropylene and a fluorinated ethylene selected from the group consisting of vinylidene fluoride and 1,1-fluorochloroethylene, said vulcanized elastomer being crosslinked directly by a bond between a carbon atom of one chain and a carbon atom of another chain.

6. The vulcanizate of claim 5 in which the elastomeric copolymer is a copolymer of perfluoropropylene and vinylidene fluoride.

7. The vulcanizate of claim 5 in which the elastomeric copolymer is a copolymer of perfluoropropylene and 1,1-fluorochloroethylene.

8. A vulcanizate of an elastomeric copolymer of perfluoropropylene and a fluorinated ethylene selected from the group consisting of vinylidene fluoride and 1,1-fluorochloroethylene, said vulcanized elastomer being crosslinked through sulfur atoms between a carbon atom of one chain and a carbon atom of another chain.

9. The vulcanizate of claim 8 in which the elastomeric copolymer is a copolymer of perfluoropropylene and vinylidene fluoride.

10. The vulcanizate of claim 8 in which the elastomeric copolymer is a copolymer of perfluoropropylene and 1,1-fluorochloroethylene.

References Cited in the file of this patent

UNITED STATES PATENTS

| | | |
|---|---|---|
| 2,495,286 | Brubaker | Jan. 24, 1950 |
| 2,549,935 | Sauer | Apr. 24, 1951 |
| 2,820,776 | Robb et al. | Jan. 21, 1958 |
| 2,833,752 | Honn et al. | May 6, 1958 |
| 2,965,619 | Honn et al. | Dec. 20, 1960 |